United States Patent
Buchmann

(10) Patent No.: US 9,140,300 B2
(45) Date of Patent: Sep. 22, 2015

(54) SLIDING GUIDANCE FOR A LOAD-HANDLING DEVICE

(71) Applicant: SSI SCHAEFER PEEM GMBH, Graz (AT)

(72) Inventor: Rainer Buchmann, Graz (AT)

(73) Assignee: SSI SCHÄFER PEEM GMBH, Graz (AT)

(*) Notice: Subject to any disclaimer, the term of this patent is extended or adjusted under 35 U.S.C. 154(b) by 0 days.

(21) Appl. No.: 14/329,260

(22) Filed: Jul. 11, 2014

(65) Prior Publication Data
US 2014/0321778 A1   Oct. 30, 2014

Related U.S. Application Data

(63) Continuation of application No. PCT/EP2013/050111, filed on Jan. 4, 2013.

(30) Foreign Application Priority Data

Jan. 11, 2012 (DE) .......................... 10 2012 000 551

(51) Int. Cl.
*F16C 29/02* (2006.01)
*F16C 29/10* (2006.01)
(Continued)

(52) U.S. Cl.
CPC ................ *F16C 29/10* (2013.01); *B66F 9/141* (2013.01); *F16C 29/005* (2013.01); *F16C 29/02* (2013.01); *B23Q 1/26* (2013.01); *B66C 23/08* (2013.01)

(58) Field of Classification Search
CPC ........ F16C 29/02; F16C 29/10; F16C 29/005; B66F 9/141; B66C 23/08; B23Q 1/26
USPC ........... 384/18, 21, 23, 26, 35, 42; 312/330.1, 312/333
See application file for complete search history.

(56) References Cited

U.S. PATENT DOCUMENTS 3,319,335 A * 5/1967 Halbrook .......................... 33/1 R
3,904,254 A * 9/1975 Hagen et al. .................... 384/18

(Continued)

FOREIGN PATENT DOCUMENTS

DE          41 12 126 A1    10/1992
DE   20 2004 004 620 U1     9/2004
WO        2011/018553 A1     2/2011

OTHER PUBLICATIONS

International Search Report and Written Opinion for corresponding application No. PCT/EP2013/050111 dated Mar. 27, 2013.

*Primary Examiner* — Marcus Charles
(74) *Attorney, Agent, or Firm* — Renner, Otto, Boisselle & Sklar, LLP

(57) ABSTRACT

A guiding device comprising: a first rail and a second rail; a first bearing and a second bearing, wherein each of the bearings has a bearing body comprising a top side and a bottom side which are arranged oppositely to each other, wherein the first rail is coupled to the top side and wherein the second rail is coupled to the bottom side; wherein each of the bearing bodies is adapted to guide the rails in a retracting and extracting direction, preferably in a form-fitting linear manner; wherein each of the bearing bodies comprises at least first and second locking devices, wherein each of the locking devices can be activated and deactivated; wherein each first locking device is arranged in a region of the corresponding top side for blocking, in an activated state, a relative movement between the bearing body and the first rail in the retracting and extracting direction and for allowing the relative movement in a deactivated state; and wherein each second locking device is arranged in a region of the corresponding bottom side for blocking, in an activated state, the relative movement between the bearing body and the second rail in the retracting and extracting direction and for allowing the relative movement in a deactivated state.

9 Claims, 4 Drawing Sheets

(51) Int. Cl.
  *B66F 9/14* (2006.01)
  *F16C 29/00* (2006.01)
  *B23Q 1/26* (2006.01)
  *B66C 23/08* (2006.01)

(56) References Cited

U.S. PATENT DOCUMENTS

| | | | |
|---|---|---|---|
| 3,975,063 A * | 8/1976 | Mahotka et al. | 384/18 |
| 4,988,262 A | 1/1991 | Gines | |
| 5,292,198 A * | 3/1994 | Rock et al. | 384/21 |
| 5,316,389 A * | 5/1994 | Hoffman | 384/18 |
| 5,466,060 A * | 11/1995 | Hoffman | 312/334.8 |
| 5,570,943 A * | 11/1996 | Schroder et al. | 312/334.11 |
| 5,671,988 A * | 9/1997 | O'Neill | 312/334.44 |
| 6,254,209 B1 * | 7/2001 | Parvin | 312/334.44 |
| 6,460,954 B1 * | 10/2002 | Bayani et al. | 312/334.44 |
| 2009/0314582 A1 | 12/2009 | Meijer | |
| 2011/0123258 A1 * | 5/2011 | Braun et al. | 403/109.3 |

* cited by examiner

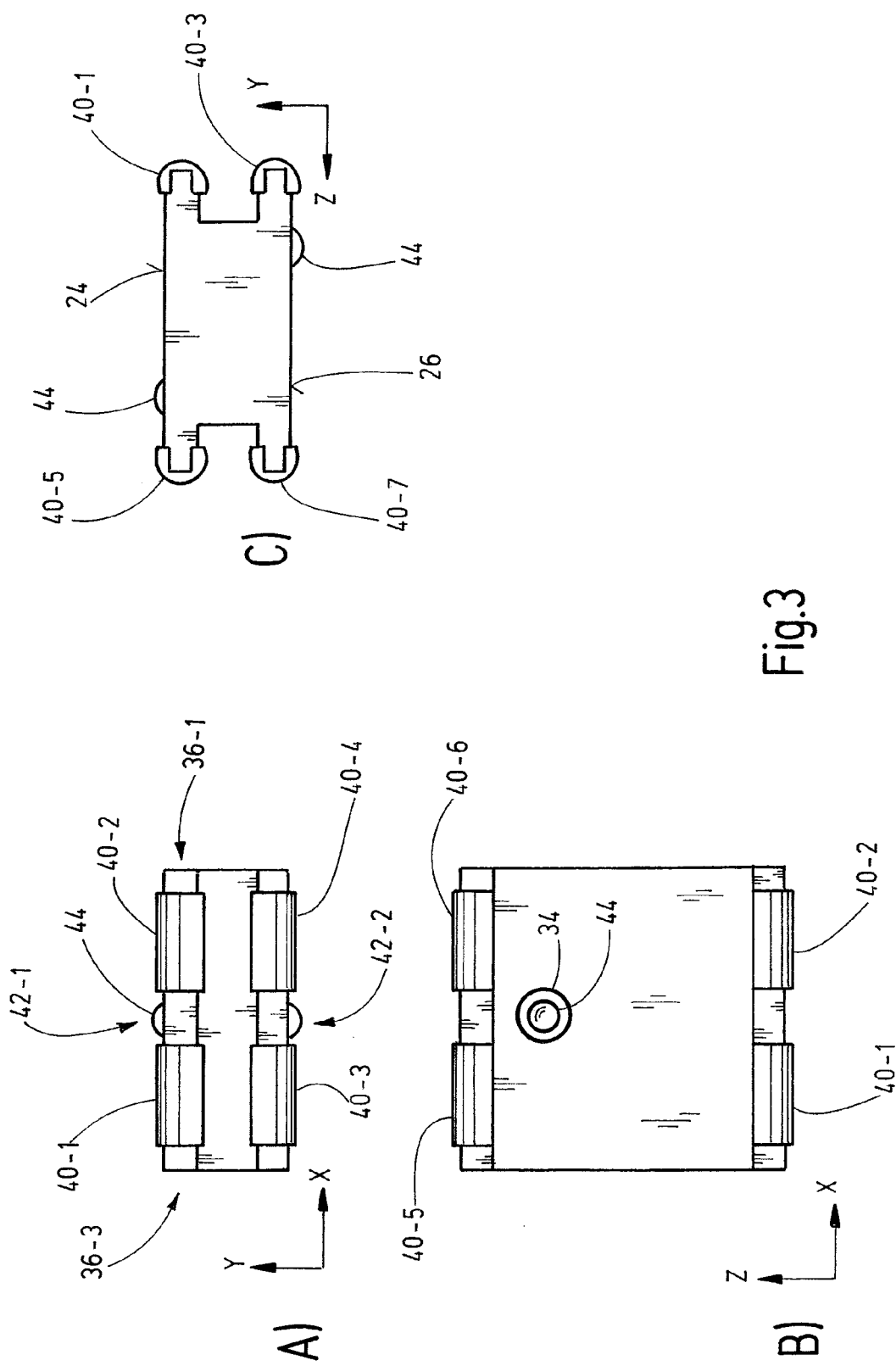

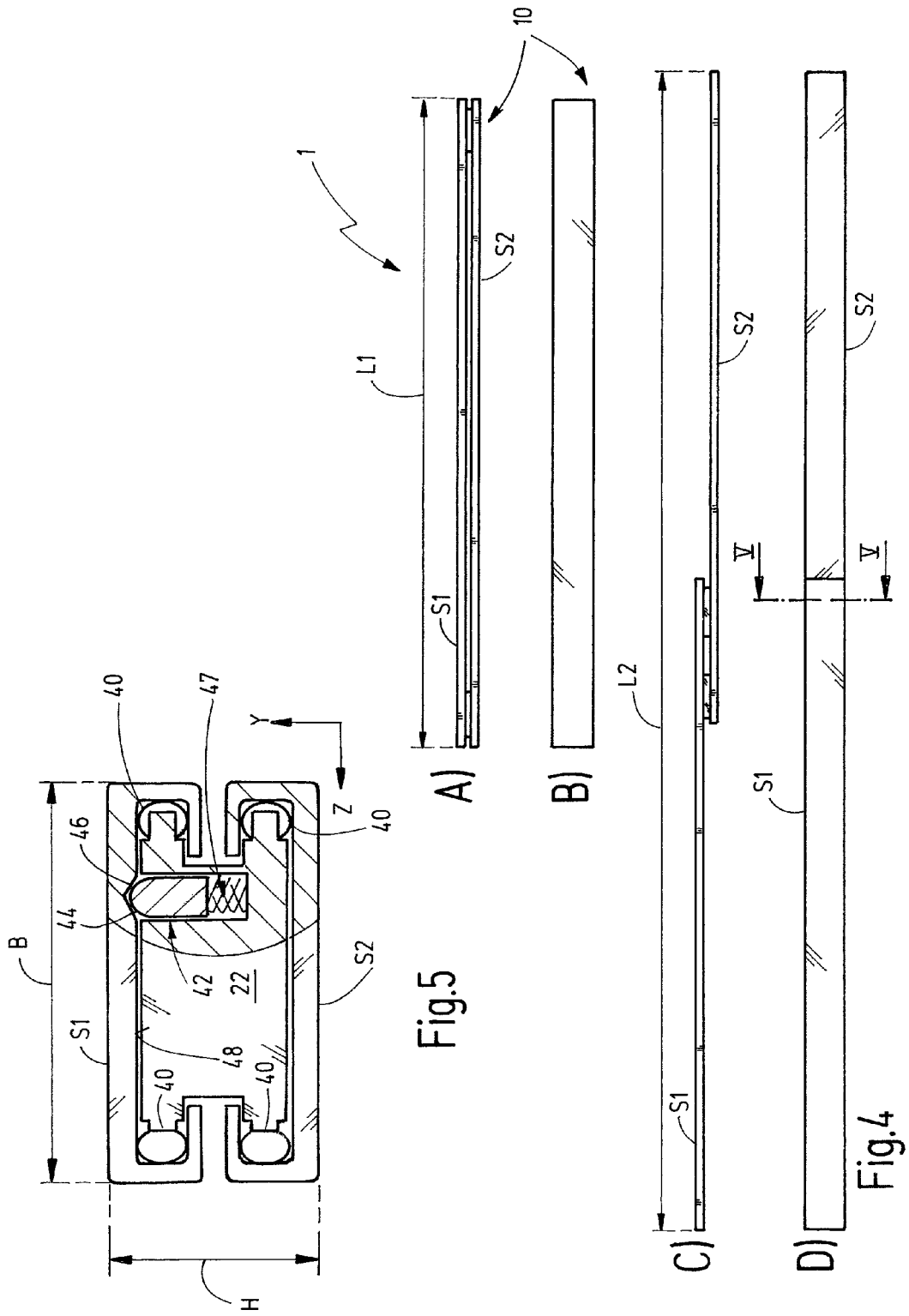

SLIDING GUIDANCE FOR A LOAD-HANDLING DEVICE

RELATED APPLICATIONS

This is a continuation application of the co-pending international patent application PCT/EP2013/050111 (WO 2013/104568 A1) filed on Jan. 4, 2013, which claims the priority of the German patent application DE 10 2012 000 551.2 filed on Jan. 11, 2012, both of which are incorporated herein fully by reference.

BACKGROUND OF THE INVENTION

The present invention relates to a guiding device which can be used, for example, with telescopic load-handling devices (herein after briefly designated as "LHD") of storage and retrieval devices (herein after briefly designated as "SRD"), in particular with a one-plane servicing device or a shuttle.

RELATED PRIOR ART

The document U.S. Pat. No. 4,988,262 A discloses a shuttle having a increased range. The document DE 20 2004 004 620 U1 discloses a warehouse system. The document DE 41 12 126 A1 discloses a device for positioning a movable device.

Conventional telescopic load-handling devices such as telescopic forks comprise different mechanisms for retracting and extracting the forks. The forks have a gear-tooth outline cooperating with a gear for retracting and extracting the fork.

SUMMARY OF THE INVENTION

It is an object of the present invention to provide an enhanced guiding device, in particular for a load-handling device which is telescopic, wherein the guiding device compensates overturning moments as good as possible which occur in extracted states.

According to a first aspect of the invention it is disclosed a guiding device comprising: a first rail and a second rail; a first bearing and a second bearing, wherein each of the bearings has a bearing body comprising a top side and a bottom side, which are arranged oppositely to each other, wherein the first rail is coupled to the top side and the second rail is coupled to the bottom side; wherein each of the bearing bodies is configured to guide the rails in retracting and extracting directions; wherein each of the bearing bodies comprises at least first and second locking devices, wherein each of the locking devices is activable and deactivable; wherein each of the first locking devices is arranged in a region of a corresponding top side for blocking, in an activated state, a relative movement of the bearing body and the first rail in the retracting and extracting directions and for allowing the relative movement in a deactivated state; and wherein each of the second locking devices is arranged in a region of a corresponding bottom side for blocking, in an activated state, a relative movement of the bearing body and the second rail in the retracting and extracting directions and for allowing the relative movement in a deactivated state.

According to a second aspect of the invention it is disclosed a guiding device of a telescopic load-handling device of a storage and retrieval device, particularly of a shuttle, comprising: a first rail and a second rail: a first bearing and a second bearing, wherein each of the bearings has a bearing body comprising a top side and a bottom side which are arranged oppositely to each other, wherein the first rail is coupled to the top side and wherein the second rail is coupled to the bottom side; wherein each of the bearing bodies is adapted to guide the rails in a retracting and extracting direction, preferably in a form-fitting linear manner; wherein each of the bearing bodies comprises at least first and second locking devices, wherein each of the locking devices can be activated and deactivated; wherein each first locking device is arranged in a region of the corresponding top side for blocking, in an activated state, a relative movement between the bearing body and the first rail in the retracting and extracting direction and for allowing the relative movement in a deactivated state; and wherein each second locking device is arranged in a region of the corresponding bottom side for blocking, in an activated state, the relative movement between the bearing body and the second rail in the retracting and extracting direction and for allowing the relative movement in a deactivated state.

The bearings being arranged between the rails ensure high stability even if the rails are extracted maximally. High overturning moments can be taken up by the locking devices, the overturning moments typically occurring while bundles (containers, trays, pallets, etc.) are grabbed. The telescopic rails are always guided linearly in a safe manner. It is clear that the present invention is also applicable to multiple-telescopic load-handling devices, or to other applications outside the area of intralogistics.

Preferably, the locking devices are formed in terms of ball-snapping devices respectively comprising one ball which protrudes in the activated state from the top side, or bottom side, for engaging in a form-fitting manner a recess in the corresponding rail, wherein the recess corresponds to a default neutral position, or extraction position, of the rail and which is retracted into the bearing body in the deactivated state for not blocking the relative movement.

Further, it is preferred to provide at least two recesses, wherein a first recess determines the neutral position of the rails relative to each other and wherein a second recess determines the extraction position of one of the rails.

With a particular embodiment the recesses are provided in one side of the respective rail facing the bearing bodies.

Thus, the recesses are not visible from the outside and do not obstruct, for example, the putting of bundles onto the rails.

With another preferred embodiment each bearing body is formed in a mirror-symmetric manner and comprises a base area which comprises, laterally to a central section, first and second wing sections, wherein the locking devices are preferably provided in one of the wing sections.

In particular, each of the rails comprises a substantially U-shaped, or C-shaped, cross section in a plane perpendicular to the retracting and extracting direction in order to surround the bearing bodies laterally, preferably in a form-fitting manner.

Preferably, a drive is provided which is coupled at least to one of the rails, or at least to one of the bearing, in order to retract and extract the rail.

Further, a load-handling device and a storage and retrieval device comprising the guiding device of the present invention are proposed.

BRIEF DESCRIPTION OF THE DRAWINGS

It is clear, that the above mentioned and herein after still to be explained features are not only applicable in the respectively given combination but also in other combinations, or alone, without departing from the scope of the present invention.

Embodiments of the invention are depicted in the drawings and will be explained in more detail in the following description.

FIG. 3 shows a side view (FIG. 3A), a top view (FIG. 3B), and a front view (FIG. 3C) of the bearing body of FIG. 2;

FIG. 4 shows a side view (FIG. 4A) of a LHD in the retracted state, a top view (FIG. 4B) of FIG. 4A, a side view (FIG. 4C) of the LHD of FIGS. 4A and 4B in the extracted state, as well as a top view (FIG. 4D) of the LHD of FIG. 4C; and FIG. 5 shows a sectional view along the line V-V in FIG. 4D.

PREFERRED EMBODIMENTS OF THE INVENTION

Figure 1:
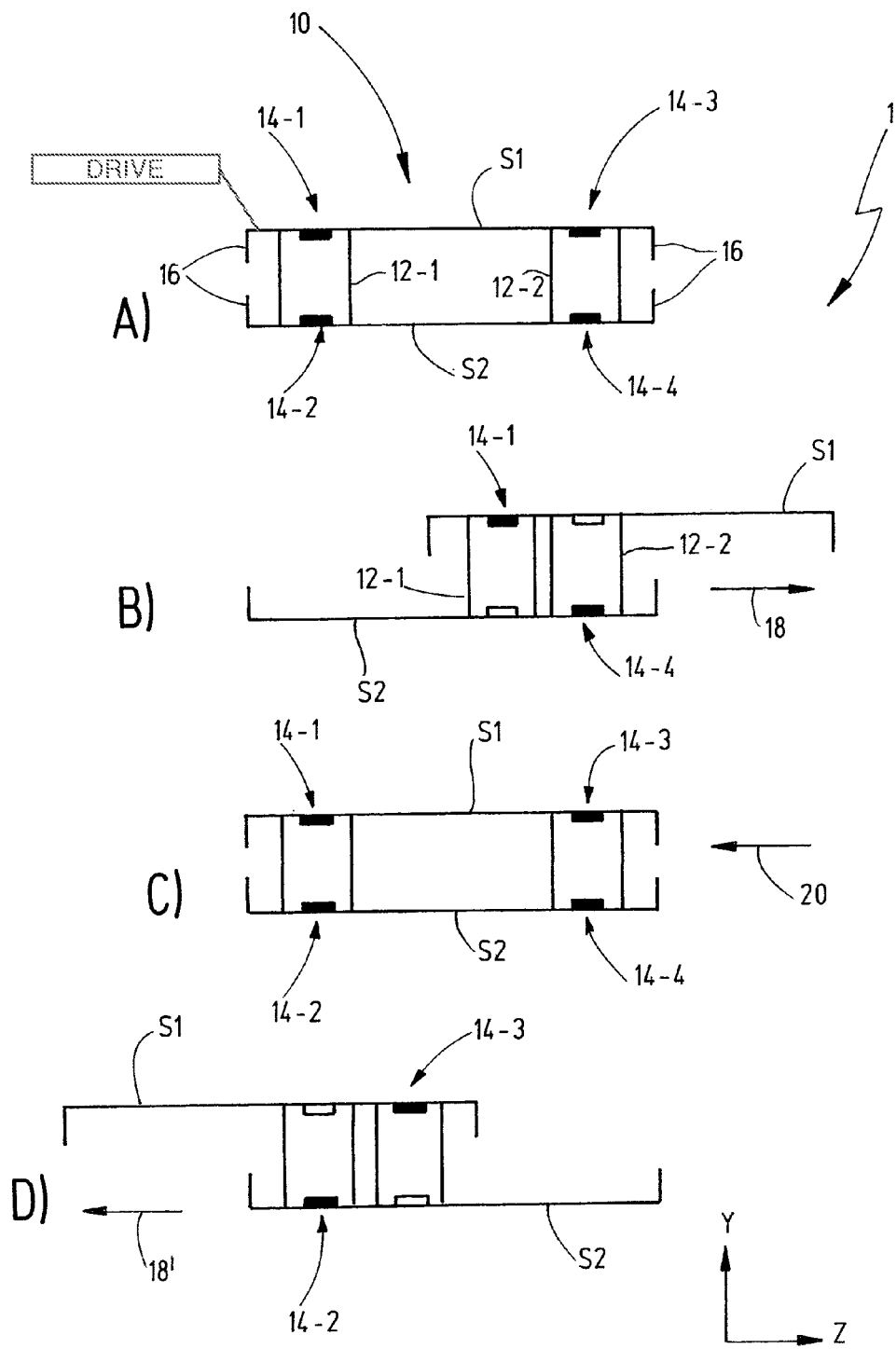
FIG. 1 A-D show side views of different states of a guiding device in accordance with the invention by means of an exemplary LHD.

In the following description of the invention same parts and features are designated by the same reference numerals, wherein the disclosure, which is contained in the entire description, can be transferred roughly to identical parts and features having the same reference numerals. Positional information such as "top", "bottom", "left", "right", "horizontal", "vertical", etc. are related to the immediately described figure and are to be transferred roughly to the new position in case of a positional change.

Further, it is to be considered that directional information and orientations are used which in principle are similar to the designations which are typically used in the field of (intra-) logistics. Consequently, the longitudinal direction (SRD-travelling direction or longitudinal direction of a warehouse) is designated by "X", the depth (width) by "Z", and the "vertical" height by "Y". The exemplarily shown coordinate systems are preferably Cartesian.

FIG. 1 shows heavily simplified side views of a guiding device 1 in accordance with the invention in different positions which is integrated, for example, into a LHD 10 of a SRD, or a shuttle. The guiding device 1 comprises an (upper) rail S1 and a (lower) rail S2 between which at least two bearing devices, or bearings, preferably slide bearings 12-1 and 12-2 can be locked as well as supported in a freely displaceable manner. In the following, for example, slide bearings 12 are considered only. It is clear that the present invention can also be used with other bearing types. The lockability is achieved by means of locking devices 14 which will be described hereinafter in more detail later. Longitudinal ends of the rails S1 and S2 can be provided with mechanical stoppers 16 for preventing the rails S1 and S2 from getting separated from the slide bearings 12 in their respective extreme positions. Grabbing devices, or similar, by means of which the rails 12 are connected for retracting and extracting load-handling devices, are not shown.

Slide bearings represent a type of bearing which is frequently used in the field of mechanical engineering and device engineering. Within the slide bearing the parts, which are movable relative to each other, are typically in direct contact. They slide on each other against a resistance caused by sliding friction. The resistance can be kept low by means of the selection of a low-friction material match, by lubrication, or by generating a lubrication film (complete lubrication), which separates both of the contact areas from each other. However, the bearing device can also be formed in accordance with the principles of a rolling removal.

FIG. 1A shows a side view of the LHD 10 in a normal position in which the rails S1 or S2 are not extracted. In this position, the rails S1 and S2, which preferably have the same length, overlap each other completely. In the side view of FIG. 1B the rail S1 is extracted at maximum to the right. An arrow 18 indicates an extraction movement. The first slide bearing 12-1 is rigidly coupled to the upper rail S1, and at the same time movable along the lower rail S2. The second slide bearing 12-2 is rigidly connected to the lower rail S2 so that the first rail S1 can move freely along the second slide bearing 12-2. The side view of FIG. 10 shows the LHD 10 again in the normal position in accordance with FIG. 1A, if the upper rail S1 is returned from the extracted position shown in FIG. 1B, as indicated by means of an arrow 20. The side view of FIG. 1D shows the upper rail S1 in a position which is extracted at maximum to the left, as indicated by means of an arrow 18'. In order to get into this position the upper rail S1 is rigidly connected to the second slide bearing 12-2 and the first slide bearing 12-1 is rigidly connected to the lower rail S2.

In FIG. 1 the locking devices 14 are depicted in two different states. In an activated state the locking devices 14 are illustrated dark. In the deactivated state the locking devices 14 are illustrated light. In an activated state the locking devices 14 connect the respective rail S1 and/or S2 rigidly to the corresponding slide bearings 12-1 and/or 12-2. The locking devices 14 can connect the slide bearings 12 mechanically (e.g. by means of a snapping-ball device) or in any other way to the rails S1 and S2. The locking devices 14 can act, for example, magnetically by energizing an electromagnet in order to fix the rail S1 or S2. In FIG. 1A each of the locking devices 14-1 to 14-4 is locked. The load-handling device, or LHD 10, is located in a central position in FIG. 1A. The rails S1 and S2 are located in their respective neutral position. The upper rail S1 can be connected to a drive, which is not shown, for retracting and extracting the same in the direction Z. The rail S2 is rigidly connected to the SRD (which is not shown either, e.g. by means of a lifting platform thereof) which in turn defines a zero position.

If the rail S1 is to be extracted in the positive direction Z at least the locking devices 14-2 and 14-3 are deactivated. The locking devices 14-1 and 14-4 can remain activated. The deactivation of the second locking device 14-2 of the first slide bearing 12.1 allows the first slide bearing 12-1 to be moved along the second rail S2. The activation of the first locking device 14-2 allows the first slide bearing 12-1 to move together with the first rail S1, as indicated in FIG. 1B by means of the extraction movement 18 in terms of an arrow to the right. The deactivation of the first locking device 14-3 of the second slide bearing 12-2 allows the first rail S1 to move along the second slide bearing 12-2. The activation of the second locking device 14-4 of the second slide bearing 12-2 causes the second slide bearing 12-2 not to move relative to the second rail S2 during the extraction movement 18.

In the central position shown in FIG. 1C each of the locking devices 14-1 to 14-4 is activated again. The locking devices 14-1 to 14-4 remain in states shown in FIG. 1B until the central position of FIG. 1C is reached, in order to get from the extracted position, as shown in FIG. 1B, to the central position of FIG. 1C.

For extracting the upper rail S1 in the negative direction Z, as indicated by means of an arrow 18' in FIG. 1D, the first locking device 14-1 is deactivated and the second locking device 14-2 of the first slide bearing 12-1 is activated, wherein the first locking device 14-3 of the second slide bearing 12-2 is activated and the second locking device 14-4 is deactivated.

It is clear that a change between the activated state and the deactivated state can be controlled actively by a superordinated control (not shown). However, it is also possible, as will be explained hereinafter in more detail, to change between the activated state and the deactivated state in a passively or mechanically-induced manner.

During the extraction movements 18 and 18' the stoppers 16 cause the slide bearings 12 to be moved nevertheless to the desired positions if one of the corresponding locking devices should fail. If exemplarily the extraction movement 18 (cf. FIGS. 1A and 1B) is considered, then the stoppers 16 would take care, if each of the locking devices 14 should fail, that the first slide bearing 12-1 is moved to the right, whereas the second slide bearing 12-2 is retained at the right outer edge. The locking devices 14 are merely required for movement back to the central position (cf. transition FIGS. 1B to 1C) in order to move the first slide bearing 12-1 together with the upper rail S1 back to the central position. The activated locking device 14-4 prevents the second sliding bearing 12-2 from being moved to the left during the retraction movement 20.

Figure 2:
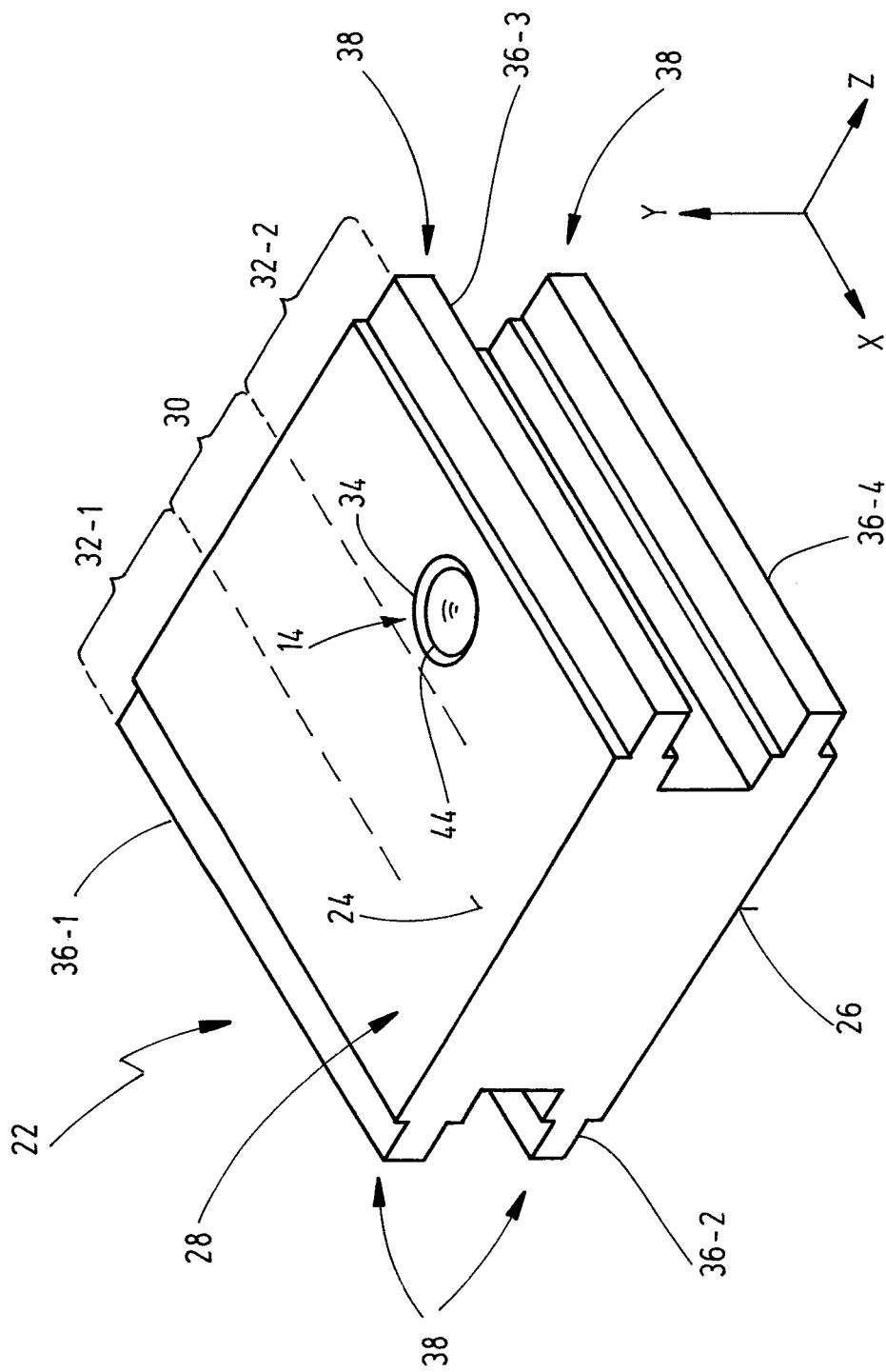
FIG. 2 shows a perspective view of a bearing body.

FIG. 2 shows a perspective view of a bearing body 22 of one of the slide bearing 12-1 and 12-2 of FIG. 1. The bearing body 22 comprises a top side 24 and a bottom side 26 which are preferably planar. The top side 24 and the bottom side 26 are arranged oppositely to each other, preferably in parallel. In FIG. 1 the top side 24 faces a bottom side of the upper rail S1. The bottom side 26 faces a top side of the lower rail S2 in FIG. 1.

A base area 28 of the bearing body 22 is exemplarily selected in a rectangular shape. It is clear that other geometries can be selected such as a T-shaped base area. The bearing body 22 can be divided into a central section 30 and wing sections 32-1 and 32-2 laterally adjacent thereto. The locking devices 14 can be arranged in each of the sections 30 and 32. In FIG. 2 the locking device 14 is arranged in the second wing section 32-2. Preferably, the two locking devices 14 are arranged in opposite wing sections 32 so that the locking device 14, which is not shown in FIG. 2, is arranged in the region of the bottom side 26 in the first wing section 32-1. The locking device 14 shown in FIG. 2 is arranged in an opening 34 in the top side 24 in the second wing section 32-2.

In the outer region overhanging noses 36 are provided. The noses 36, of which exemplarily two are provided for each wing section 32, can be used for fixing slide elements 40 (cf. FIG. 3) on which the rails S1 and S2 are moved slidingly. The noses 36 thus represent connecting sections 38, where the rails S1 and S2 couple to the bearing body 22. The noses 36 can also be arranged in a C-shaped manner.

FIG. 3 shows a side view (FIG. 3A), a top view (FIG. 3B), and a front view (FIG. 3C) of the bearing body 22 of FIG. 2 which is provided with slide elements 40. Each nose 36 is exemplarily provided with two slide elements 40 which can be pinned thereon, for example. Each of the four noses 36 is provided, for example, with two slide elements 40. It is clear that each nose 36 could also be provided with only one single continuous slide element 40. The noses 36 as such can be formed as slide elements 40.

The front view of FIG. 4C shows that the locking devices 14 are provided at opposite sides 24 and 26 in oppositely arranged wing sections 32-1 and 32-2.

The locking devices 14 are formed exemplarily in this case in terms of ball-snapping devices 42, wherein preferably two ball-snapping devices 42-1 and 42-2 are provides for each bearing body 22. The ball-snapping devices 42 respectively comprise an element 44 such as a ball or a ball-shaped pin, protruding from the opening 34 (cf. FIG. 2) in the activated state. This will be explained in more detail in the context of FIG. 5.

FIG. 4 shows in the side view of FIG. 4A and in the top view of FIG. 4B the guiding device 1 of the invention, which in turn is integrated into a LHD 10, in the central position. In the side view of FIG. 4C and the top view of FIG. 4D the LHD 10 is shown in an extracted position, namely in the position extracted to the left. FIG. 4D contains an imaginary line V-V for the illustration of FIG. 5, which shows a partially sectional view along the line V-V. The length L1 of the guiding device 1 or the LHD 10, in the central position exemplarily is 640 mm, whereas the length L2 in the (maximal) extended state exemplarily is 1140 mm.

The locking device 14 is formed in terms of a ball-snapping device 42 which can comprise the element 44, such as a ball, or a ball-shaped pin, which is preferably biased by means of a spring device 47. The element 44 is pressed out from the bearing body 22 by means of the spring device 47.

In the assembled state of the guiding device 1 the rails S1 and S2 surround the bearing body 22, and in particular the noses 36, substantially in a form-fitting manner. The rails S1 and S2 are sitting on the slide elements 40, which preferably comprise a low friction coefficient. The ball-snapping device 42 engages in FIG. 5, preferably in a form-fitting manner, a recess 46, which is provided in a side 48 of the rail S1 which faces the bearing body 22 in the assembled state of the guiding device 1. Preferably, the rails S1 and S2 respectively comprise two recesses 46 which are arranged at locations representing the extreme positions (cf. e.g. FIGS. 1A and 1B). If the drive exerts a force onto the rail S1 the element 44 can disengage the recess 46 so that a relative movement between the slide bearing 12 and the corresponding rail S1 or S2 is possible. The spring bias defines the associated threshold value.

It is clear that the guiding device of the invention can be incorporated, for example, into a load-handling device used in the field of logistics. Corresponding load-handling devices can be used with, for example, storage and retrieval devices, stacker cranes, shuttles, and the like.

Therefore, what I claim is:

1. A guiding device comprising:
   a first rail and a second rail;
   a first bearing and a second bearing, wherein each of the bearings has a bearing body comprising a top side and a bottom side, which are arranged oppositely to each other, wherein the first rail is coupled to the top side and the second rail is coupled to the bottom side;
   wherein each of the bearing bodies is configured to guide the rails in retracting and extracting directions;
   wherein each of the bearing bodies comprises at least first and second locking devices, wherein each of the locking devices is activable and deactivable;
   wherein each of the first locking devices is arranged in a region of a corresponding top side for preventing, in an activated state, a relative movement of the bearing body and the first rail in the retracting and extracting directions and for allowing the relative movement in a deactivated state; and
   wherein each of the second locking devices is arranged in a region of a corresponding bottom side for preventing in an activated state, a relative movement of the bearing body and the second rail in the retracting and extracting directions and for allowing the relative movement in a deactivated state.

2. The guiding device of claim 1, wherein the first and second rails are guided by the bearing bodies in a form-fitting linear manner.

3. The guiding device of claim 1, wherein the locking devices are ball-snapping devices respectively comprising a ball protruding in the activated state from the top side, or the bottom side, thereby engaging a recess in the corresponding rail in a form-fitting manner, wherein the recess corresponds to a default neutral position, or an extraction position, of the corresponding rail, wherein each of the ball-snapping devices is configured to be not retracted into to the bearing body in the deactivated state in order not to prevent the relative movement.

4. The guiding device of claim 3, wherein each of the rails comprises at least two of said recesses, wherein a first recess is arranged to determine the default neutral position of the rails relative to each other, and wherein a second recess is arranged to determine the extraction position of one of the rails.

5. The guiding device of claim 3, wherein the recesses are provided in one side of the respective rail which faces the bearing bodies.

6. The guiding device of claim 1, wherein each of the bearing bodies is structured in a mirror-symmetric manner and comprises a base area forming, laterally relative to a central section, first and second wing sections.

7. The guiding device of claim 6, wherein the locking devices are provided in one of the wing sections.

8. The guiding device of claim 1, wherein each of the rails comprises a substantially U-shaped, or C-shaped, cross section in a plane perpendicular to the retracting and extracting directions for surrounding the bearing body laterally.

9. The guiding device of claim 1, further comprising a drive being coupled at least to one of the rails, or at least to one of the bearings, for retracting and extracting the one of the rails.

\* \* \* \* \*